(12) United States Patent
Martin et al.

(10) Patent No.: US 7,555,581 B2
(45) Date of Patent: Jun. 30, 2009

(54) COMMUNICATIONS DISPLAY BASE SYSTEM AND METHOD

(75) Inventors: Randall W. Martin, The Woodlands, TX (US); Paul L. Drew, The Woodlands, TX (US); David Quijano, Magnolia, TX (US); Morten Warren, Surrey (GB); Nick Woodley, London (GB); Stephen de Saulles, London (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 11/253,032

(22) Filed: Oct. 17, 2005

(65) Prior Publication Data

US 2007/0088875 A1   Apr. 19, 2007

(51) Int. Cl.
  *G06F 13/00* (2006.01)
  *H05K 7/10* (2006.01)

(52) U.S. Cl. .................... 710/62; 710/303

(58) Field of Classification Search ............ 710/62, 710/72, 303; 361/681; 312/237
See application file for complete search history.

(56) References Cited

U.S. PATENT DOCUMENTS

| | | | |
|---|---|---|---|
| 4,681,378 A | 7/1987 | Hellman, III | |
| 4,736,826 A | 4/1988 | White et al. | |
| 4,866,215 A | 9/1989 | Muller et al. | |
| 5,018,052 A | 5/1991 | Ammon et al. | |
| 5,021,968 A | 6/1991 | Ferketic | |
| 5,272,988 A | 12/1993 | Kelley et al. | |
| 5,286,919 A | 2/1994 | Benson et al. | |
| 5,432,505 A | 7/1995 | Wise | |
| 5,473,994 A | 12/1995 | Foley et al. | |
| 5,515,037 A | 5/1996 | Wise | |
| 5,523,747 A | 6/1996 | Wise | |
| 5,541,586 A | 7/1996 | Wise | |
| 5,615,682 A | 4/1997 | Stratz, Sr. | |
| 5,640,482 A | 6/1997 | Barry et al. | |
| 5,769,374 A | 6/1998 | Martin et al. | |
| 5,804,765 A | 9/1998 | Siemon et al. | |
| 5,831,211 A | 11/1998 | Gartung et al. | |
| 5,833,332 A | 11/1998 | Marshall et al. | |
| 5,893,539 A | 4/1999 | Tran et al. | |
| 5,921,402 A | 7/1999 | Magenheimer | |
| 5,957,556 A | 9/1999 | Singer et al. | |
| 6,016,252 A | 1/2000 | Pignolet et al. | |
| 6,050,849 A | 4/2000 | Chang | |
| 6,202,567 B1 | 3/2001 | Funk et al. | |

(Continued)

OTHER PUBLICATIONS

Ergotron, Flat Panel Mounting Solutions, Desk Stand 100- Range of Motion, Copyright 2005 (search completed Sep. 30, 2005) (2 pgs.) (http://www.ergotron.com/3_products/flat_panel/deskstands/range.asp).

*Primary Examiner*—Henry W. H. Tsai
*Assistant Examiner*—Hyun Nam (57) ABSTRACT

A communication apparatus for an electronic system is provided in accordance with the presently disclosed techniques. Specifically, in one embodiment, the apparatus includes a display base. The display base includes a body having a bay configured to receive a first electronic device and a recessed portion configured to receive a second electronic device. The display base also includes one or more cable routing features disposed within the body. One of the cable routing features is configured to route a cable connected to the first or second electronic device through a portion of the base. A system and a method for facilitating communication via a display base are also disclosed.

44 Claims, 5 Drawing Sheets

U.S. PATENT DOCUMENTS

| | | | |
|---|---|---|---|
| 6,284,978 B1 | 9/2001 | Pavillard et al. | |
| 6,303,864 B1 | 10/2001 | Johnson et al. | |
| 6,305,556 B1 | 10/2001 | Mayer | |
| 6,326,547 B1 | 12/2001 | Saxby et al. | |
| 6,327,139 B1 | 12/2001 | Champion et al. | |
| 6,330,168 B1 | 12/2001 | Pedoeem et al. | |
| 6,363,198 B1 | 3/2002 | Braga et al. | |
| 6,392,873 B1 * | 5/2002 | Honda | 361/681 |
| 6,407,933 B1 | 6/2002 | Bolognia et al. | |
| 6,409,134 B1 | 6/2002 | Oddsen, Jr. | |
| 6,427,936 B1 | 8/2002 | Noel et al. | |
| 6,435,106 B2 | 8/2002 | Funk et al. | |
| 6,435,354 B1 | 8/2002 | Gray et al. | |
| 6,483,709 B1 | 11/2002 | Layton | |
| 6,508,526 B2 * | 1/2003 | Reppas et al. | 312/237 |
| 6,525,273 B1 | 2/2003 | Cunningham | |
| 6,533,723 B1 | 3/2003 | Lockery et al. | |
| 6,546,181 B1 | 4/2003 | Adapathya et al. | |
| 6,554,218 B2 | 4/2003 | Buyce et al. | |
| D477,325 S | 7/2003 | Theis et al. | |
| 6,600,665 B2 | 7/2003 | Lauchner | |
| 6,609,691 B2 | 8/2003 | Oddsen, Jr. | |
| 6,619,606 B2 | 9/2003 | Oddsen, Jr. et al. | |
| 6,637,104 B1 | 10/2003 | Masuda et al. | |
| 6,646,893 B1 | 11/2003 | Hardt et al. | |
| 6,713,678 B2 | 3/2004 | Masuda et al. | |
| 6,719,253 B2 | 4/2004 | Oddsen, Jr. | |
| 6,721,414 B1 | 4/2004 | Rojas et al. | |
| 6,724,970 B2 | 4/2004 | Adapathya et al. | |
| 6,726,167 B2 | 4/2004 | Oddsen, Jr. | |
| 6,805,248 B2 | 10/2004 | Champion et al. | |
| 6,811,039 B2 | 11/2004 | Chen et al. | |
| 6,856,505 B1 | 2/2005 | Venegas et al. | |
| 6,902,069 B2 | 6/2005 | Hartman et al. | |
| 6,915,994 B2 | 7/2005 | Oddsen, Jr. | |
| 7,029,079 B2 * | 4/2006 | Holt | 312/223.3 |
| 7,459,634 B2 * | 12/2008 | Martin et al. | 174/97 |
| 2001/0013305 A1 | 8/2001 | Funk et al. | |
| 2001/0023914 A1 | 9/2001 | Oddsen, Jr. | |
| 2001/0024904 A1 | 9/2001 | Fischer | |
| 2002/0066843 A1 | 6/2002 | Oddsen, Jr. et al. | |
| 2002/0073516 A1 | 6/2002 | Behar | |
| 2002/0074460 A1 | 6/2002 | Behar | |
| 2003/0010862 A1 | 1/2003 | Buyce et al. | |
| 2003/0026084 A1 | 2/2003 | Lauchner | |
| 2003/0037953 A1 | 2/2003 | Sarkinen et al. | |
| 2003/0066936 A1 | 4/2003 | Beck et al. | |
| 2003/0075646 A1 | 4/2003 | Womack et al. | |
| 2003/0075655 A1 | 4/2003 | Oddsen, Jr. | |
| 2003/0080268 A1 | 5/2003 | Oddsen, Jr. | |
| 2003/0123832 A1 | 7/2003 | Adapathya et al. | |
| 2003/0168238 A1 | 9/2003 | Masuda et al. | |
| 2003/0222034 A1 | 12/2003 | Champion et al. | |
| 2003/0234328 A1 | 12/2003 | Oddsen, Jr. | |
| 2004/0065787 A1 | 4/2004 | Hardt et al. | |
| 2004/0079711 A1 | 4/2004 | Hartman et al. | |
| 2004/0108289 A1 | 6/2004 | Chen et al. | |
| 2004/0114313 A1 | 6/2004 | Mata et al. | |
| 2004/0130859 A1 * | 7/2004 | Helot et al. | 361/681 |
| 2004/0149533 A1 | 8/2004 | Milano | |
| 2004/0182798 A1 | 9/2004 | Williams | |
| 2004/0222344 A1 | 11/2004 | Oddsen, Jr. | |
| 2005/0057912 A1 | 3/2005 | Hardt et al. | |
| 2005/0067358 A1 | 3/2005 | Lee et al. | |
| 2005/0076479 A1 | 4/2005 | Rolla et al. | |
| 2005/0083305 A1 * | 4/2005 | Mambakkam et al. | 345/168 |
| 2005/0135767 A1 | 6/2005 | Diaz et al. | |
| 2007/0084621 A1 * | 4/2007 | Martin et al. | 174/97 |
| 2007/0084624 A1 * | 4/2007 | Martin et al. | 174/135 |
| 2007/0084625 A1 * | 4/2007 | Martin et al. | 174/135 |
| 2007/0086153 A1 * | 4/2007 | Martin et al. | 361/681 |

* cited by examiner

COMMUNICATIONS DISPLAY BASE SYSTEM AND METHOD

BACKGROUND

This section is intended to introduce the reader to various aspects of art which may be related to various aspects of the present invention which are described and claimed below. This discussion is believed to be helpful in providing the reader with background information to facilitate a better understanding of the various aspects of the present invention. Accordingly, it should be understood that these statements are to be read in this light, and not as admissions of prior art.

A number of electronic systems, including home entertainment systems, personal computer systems, or the like, include video displays that convey information to a user. As may be appreciated, a system including a display may further include a number of other devices that rely on cables to receive power or communicate with other devices. By way of example, in addition to displays, computer systems typically include input devices, such as keyboards and mice, and other peripheral devices, such as personal digital assistant (PDA) docks, speakers, cameras, digital music players, and so forth. In some instances, such as with portable devices including digital cameras and digital music players, it may be desirable to frequently connect these devices to a computer system to charge batteries of these devices and communicate with the computer system. Such devices may then be disconnected from the computer system, allowing the devices to be used remote from the computer system.

Unfortunately, it can be cumbersome to have a number of cables from various devices and peripherals in the same area. Indeed, the various cables can become tangled and disorganized, resulting in an unaesthetic appearance and logistical issues relating to connecting and disconnecting the cables. For example, devices can become dislodged or disconnected due to cables being snagged or pulled inadvertently. Further, connection ports for such devices and other user interfaces, such as optical or floppy drives, are often located on the computer itself. As will be appreciated, such a configuration may be inconvenient. The computer may be located near a display in a workspace to enable convenient access to such drives and ports. However, this arrangement can consume valuable workspace. Alternatively, the computer may be located further from the display, such as on the floor next to a desk. While this may free additional workspace, it is often less convenient in that the user interfaces and ports are moved further away from a user.

Consequently, there is a need for an apparatus that provides convenient interface options and cable management features in an aesthetically pleasing manner.

BRIEF DESCRIPTION OF THE DRAWINGS

Advantages of one or more disclosed embodiments may become apparent upon reading the following detailed description and upon reference to the drawings in which.

DETAILED DESCRIPTION

One or more specific embodiments of the present technique will be described below. In an effort to provide a concise description of these embodiments, not all features of an actual implementation are described in the specification. It should be appreciated that in the development of any such actual implementation, as in any engineering or design project, numerous implementation-specific decisions will be made to achieve the developers' specific goals, such as compliance with system-related and business-related constraints, which can vary from one implementation to another. Moreover, it should be appreciated that such a development effort can be complex and time consuming, but would remain a routine undertaking of design, fabrication, and manufacture for those of ordinary skill having the benefit of this disclosure. It should be noted that illustrated embodiments of the present technique throughout this text represent a general case.

Embodiments of the present technique generally relate to efficiently and aesthetically managing cables in a workspace while providing convenient device connection and user interface options. Specifically, embodiments of the present technique relate to a communications display base, which may be defined as a supporting part or a foundation of a display (e.g., the base of a monitor, video screen, all-in-one computer, panel computer, liquid crystal display or television, plasma display or television, or conventional television). Such a display base facilitates flexible organization, retention, and concealment of cables for peripheral components disposed about or on the display base, and provides convenient access to user interface devices, such as optical drives.

Figure 1:
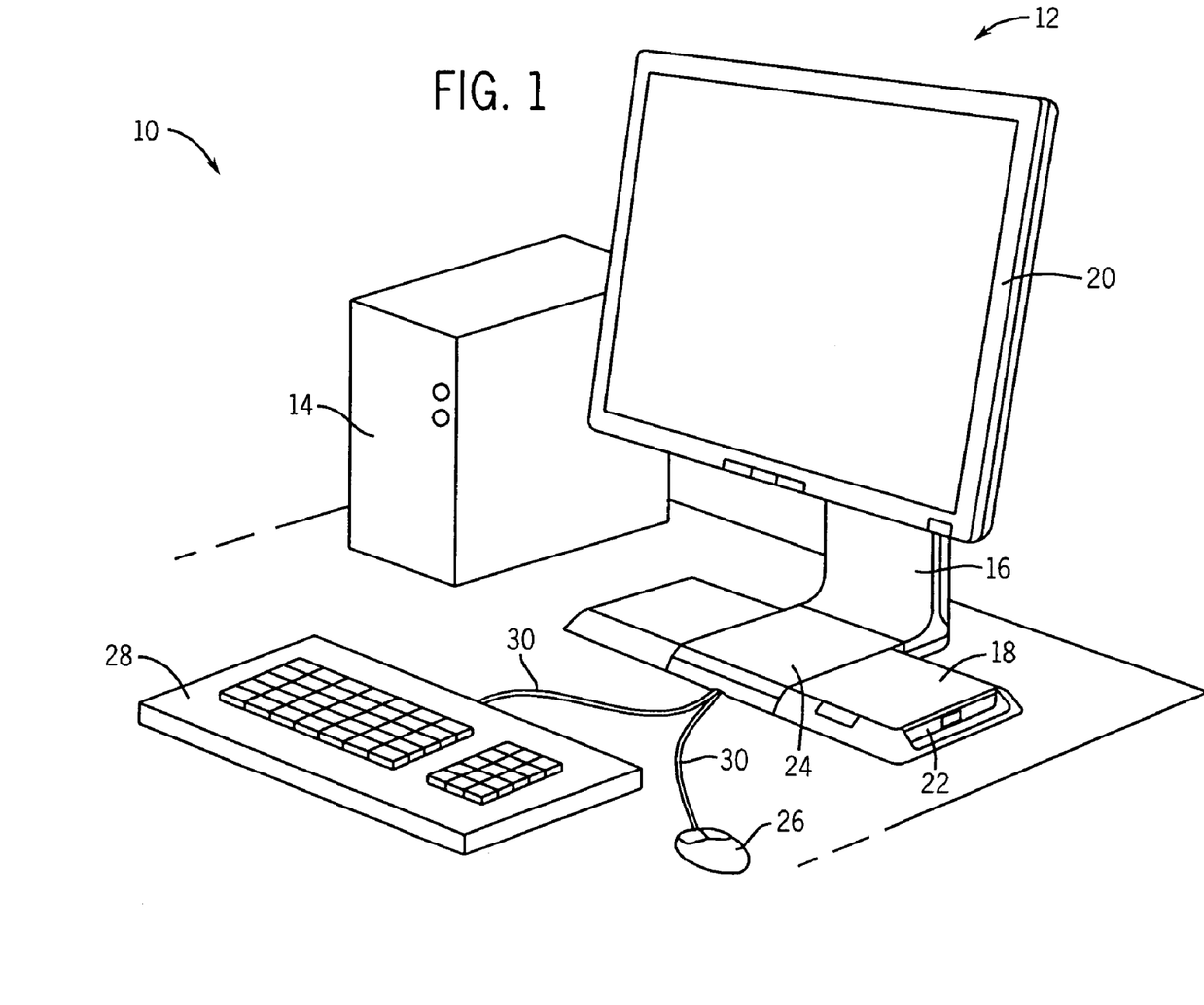
FIG. 1 is a front perspective view of a computer system with various peripheral components disposed about a display and its base in accordance with certain aspects of the present techniques.

Turning now to the figures, a computer system 10 including a display 12 and a computer 14 is illustrated in FIG. 1 in accordance with one embodiment of the present techniques. In the presently illustrated embodiment, the display 12 includes a display stand 16 coupled to a display base 18. As will be appreciated, the display stand 16 and the display base 18 are adapted to support a display housing 20, which includes a display screen and associated internal circuitry. Also, while the display 12 is a flat panel computer monitor in the presently illustrated embodiment, in other embodiments, the display 12 could include a television, a cathode ray tube (CRT), a laptop display, an all-in-one computer, a panel computer, and so forth. For example, the all-in-one computer generally includes the display 12 and computer (e.g., processor, motherboard, memory, and disc drive) all in a single enclosure. By further example, the panel computer includes a flat panel display 12 and a computer disposed in a single panel-shaped housing.

Further, display base 18 may include an electronic device, such as user interface device 22, within one or more bays of the display base. While the display base 18 includes a bay housing an electronic device 22 in opposite ends of the display base 18, other configurations are envisaged. Also, in one embodiment, the user interface device 22 includes a memory drive or electronic data storage drive, which may include a magnetic disk drive, or an optical drive, a memory chip drive, or another computer drive, or a combination thereof. For example, an exemplary optical drive may include a CD drive, a combination CD/DVD drive, an HD-DVD drive, a Blu-ray drive, or the like. As will be appreciated by one skilled in the art, such optical drives may be read-only drives, or may be configured to also write to media placed in the optical drive. An exemplary magnetic disk drive may include a hard disk drive, a floppy disk drive, a zip disk drive, a tape drive, or a combination thereof. An exemplary memory chip drive may include a smart card reader, which can accept, read, and write to one or more types of memory cards. In some embodiments, the user interface device 22 may include a hard disk drive and a removable memory drive, such as a floppy disk drive or a smart card reader. In other embodiments, the user interface device 22 may include a communications hub and/or one or more communications ports, such as those described in further detail below. The user interface device 22 also may include any other modular electronic device configured to fit within standard bays of a desktop computer, a laptop computer, or other computer systems. For example, the user interface device 22 may include an audio interface panel or modular drive, a video interface panel or modular drive, or a combination thereof. However, in the following discussion, the user interface device 22 may be described as an optical drive for convenience with the foregoing alternatives and combinations in mind.

Additionally, the display base 18 includes an internal cavity or recessed portion that is concealed by a cover 24. As discussed in greater detail below, this internal cavity may be configured to receive another electronic device, such as a communication hub. Peripheral devices, such as mouse 26 and keyboard 28, may be connected to such a communication hub, via cables 30, to interface with the computer system 10. As will be appreciated, cables 30 may include power and communication cables. It should be noted that, in some embodiments, the cables 30 include those from devices only tangentially related to the computer system 10, such as cables that extend from other devices near the display base 18. The display base 18 also includes one or more cable routing features and flexibly organizes and conceals all or a portion of cables 30 from view as they are routed through the display base 18. While the display base 18 of the illustrated embodiment is generally rectangular, the display base 18 can have various shapes, contours, and other geometric features in full accordance with the present techniques.

Figure 2:
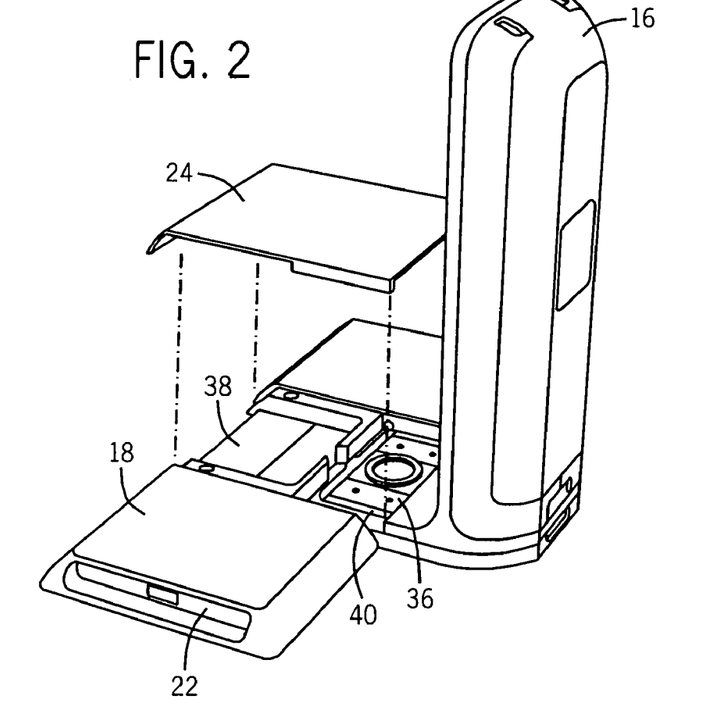
FIG. 2 is a side perspective view illustrating certain features of an exemplary display base in accordance with one embodiment of the present techniques.
Figure 4:
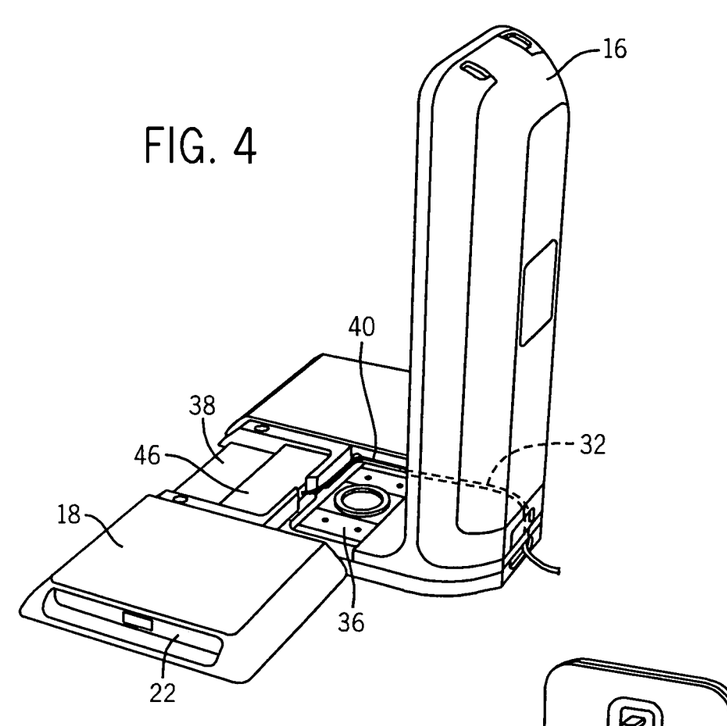
FIG. 4 is an additional perspective view of the exemplary display base of FIG. 2, illustrating cable management features of the display base and the routing of a cable from an electronic device disposed in a recessed portion of the display base in accordance with one embodiment of the present techniques.

Additional features of the display base 18 are depicted in FIG. 2. Particularly, FIG. 2 is an exploded view illustrating additional features of the display base 18 located beneath the cover 24. In the presently illustrated embodiment, the display stand 16 includes a pair of horizontal mounting features 36 that enable coupling of the display stand 16 to the display base 18. As may be appreciated, the display stand 16 may be coupled to the display base 18 via the mounting features 36 in a number of manners, such as through use of bolts, screws, thumb-screws, hooks, latches, velcro, other tool-free fasteners, an adhesive, or the like. As discussed above, the display base 18 also includes a cavity or recessed portion 38. The recessed portion 38 is configured to receive an electronic device or module 46, such as a communication hub (FIG. 4). Further, display base 18 also includes a cable management feature 40, such as a cable channel or passage through the display base 18.

Figure 3:
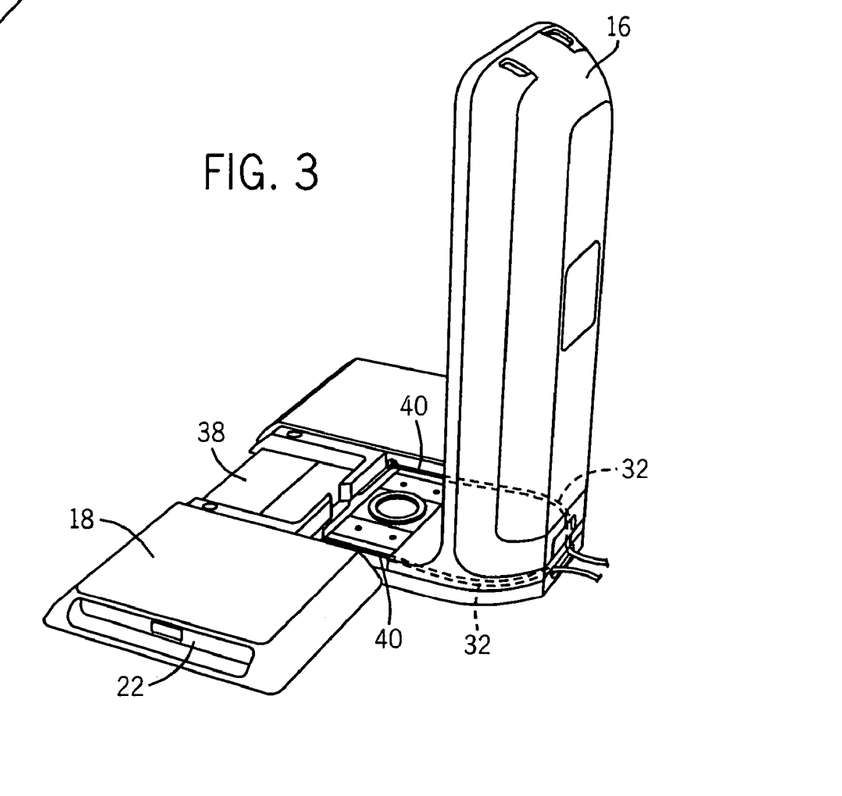
FIG. 3 is a perspective view of the exemplary display base of FIG. 2, illustrating cable management features of the display base and routing of cables from devices disposed in the ends of the display base in accordance with one embodiment of the present techniques.

Particularly, the cable management feature 40 facilitates routing of cables 32 from one or more user interface devices 22 or electronic devices disposed in cavity 38, through the display base 18, as illustrated in FIGS. 3 and 4. As shown in FIG. 3, cables 32 of user interface devices 22, which are disposed in opposite ends of the display base 18, may be routed from the rear of each device 22 through the cable channel 40 to a rear portion of the display base 18. Similarly, as illustrated in FIG. 4, a cable 32 of an electronic device 46 disposed within cavity 38 may be routed through the display base 18 via the cable management feature or channel 40.

Figure 5:
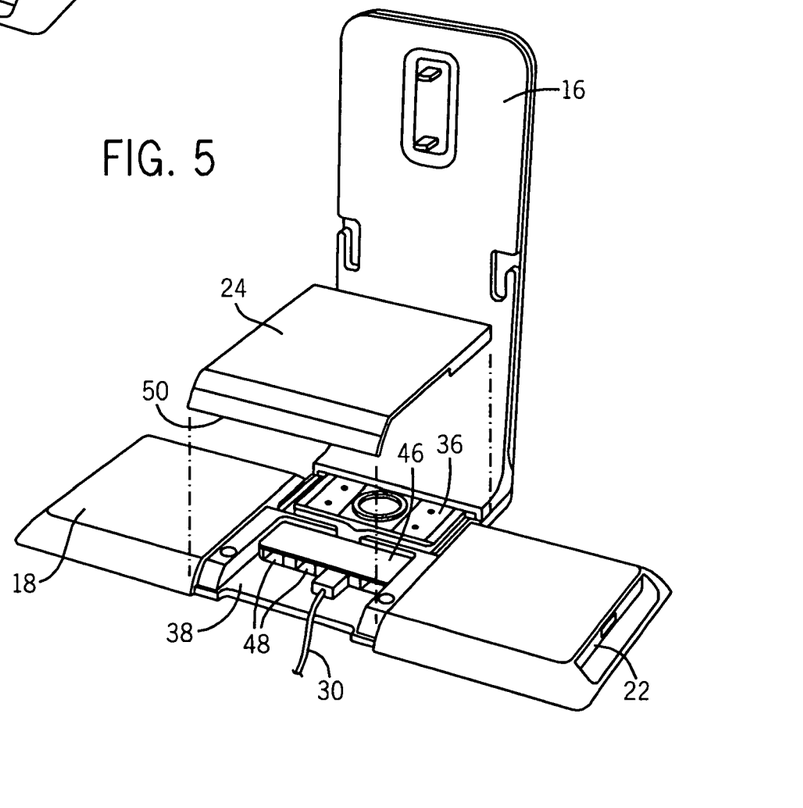
FIG. 5 is a front perspective view of the display base of FIG. 4, illustrating additional features of the exemplary display base in accordance with an embodiment of the present techniques.

A front perspective view of the display base 18 is provided in FIG. 5, which illustrates additional connection features of the display base 18 in accordance with one embodiment of the present techniques. As noted above, the electronic device 46 may include a communication hub such as a universal serial bus (USB) hub that facilitates communication between one or more peripheral USB devices and another electronic device or system, such as computer 14. In the present embodiment, the communication hub 46 includes a number of USB ports 48 to which peripheral devices may be connected via cables 30.

However, while the presently illustrated electronic device 46 is a USB hub, it will be appreciated that other electronic devices may be positioned within cavity 38 instead of, or in addition to, a USB hub. For instance, an IEEE 1394 hub (i.e., FireWire hub), a wireless hub or receiver, a network (e.g., an Ethernet) hub, an audio connection hub, a sound module, a video module, another electronic device, or any combination thereof may be disposed within cavity 38 in full accordance with the present techniques. Thus, the electronic device 46 may include one or more USB ports, IEEE 1394 ports (i.e., FireWire ports), network (e.g., Ethernet) ports, wireless access points (e.g., virtual ports), video ports (e.g., RCA, S-video, component video, DVI, HDCP, etc.), audio ports (e.g., RCA, optical, etc.), or combinations thereof. Further, while a module or device installed within may be directly related to the display in some embodiments, the module or device may be a non-display component (i.e., unrelated to the display) or ancillary to the display in other embodiments. In addition, if the electronic device 46 includes a communications hub, then the user interface device 22 may be coupled to the communications hub via the resident port. Accordingly, the user interface device 22 may be a USB-based memory drive, or a FireWire-based memory drive, or a network attached storage (NAS) drive, or the like.

As will be appreciated, the communication hub or electrical module 46 may include a housing, various circuitry disposed within the housing, and a number of connection ports electrically coupled to the internal circuitry to enable electrical communication between a peripheral device connected to the module 46 and another device, such as computer 14 (FIG. 1). As noted above, in certain embodiments, module 46 includes a cable 30 that enables connection to devices external to display base 18, such as computer 14. The connection ports of the communication hub or module 46 may include universal serial bus (USB) ports, firewire ports, network ports, telephony ports, other similar ports, or combinations thereof.

The module 46 also may include a wireless hub having a plurality of wireless ports. Peripheral devices may be plugged into these connection ports to receive power from, or to communicate with, a device to which the module 46 is connected. For instance, input devices, such as mouse 26 and keyboard 28, may be plugged into USB ports of communication hub 46 to transmit inputs to a computer connected to the hub.

Figure 6:
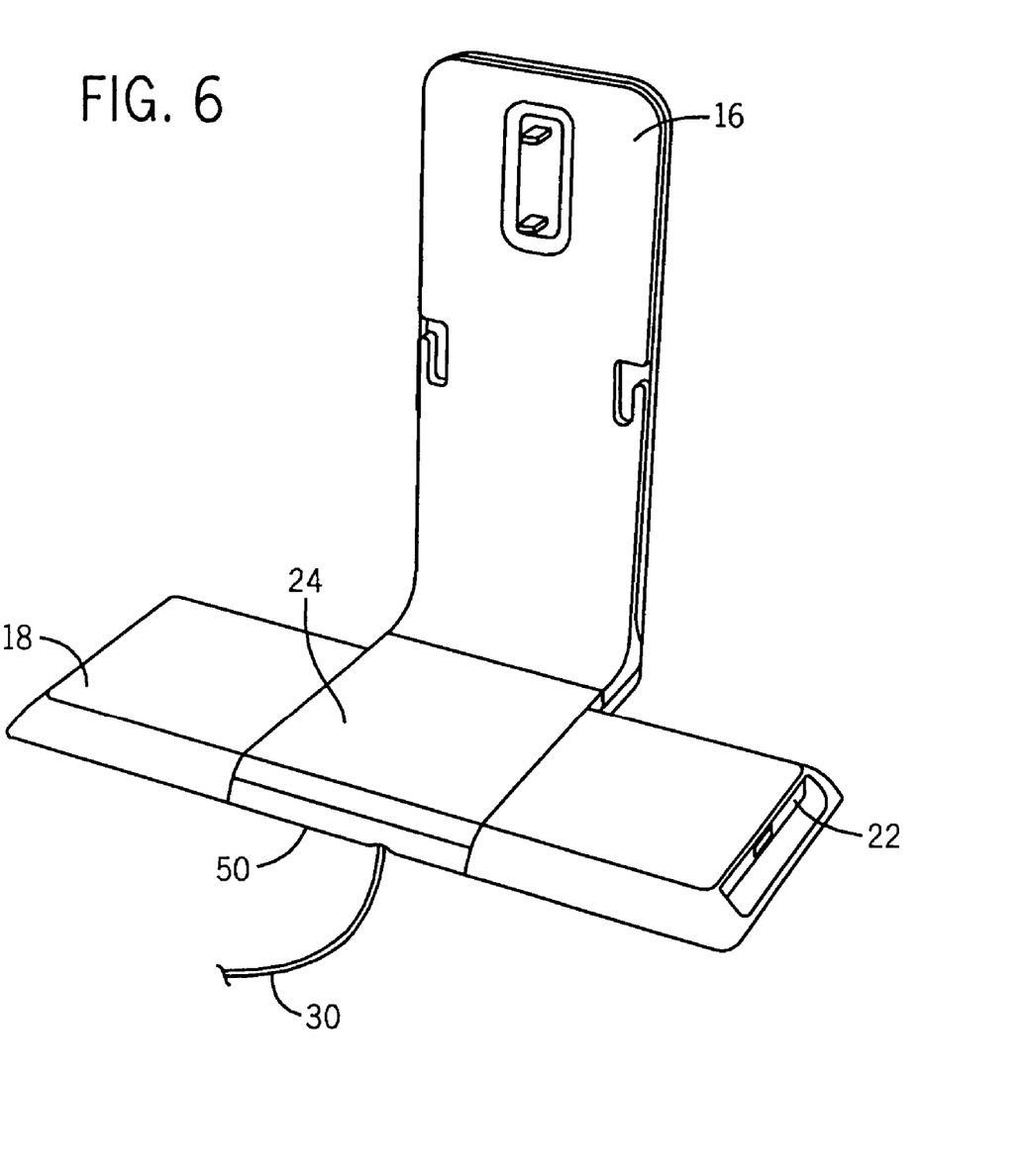
FIG. 6 is a front perspective view of the display base of FIG. 5 with a cover disposed over the recessed portion in accordance with one embodiment of the present techniques.

Once any desired physical connections between peripheral devices and the electronic device 46 within the cavity 38 are made, such as via the cables 30, the cover 24 may be placed over the cavity 38 to conceal such connections, as well as portions of the cables 30, thus providing a clean, aesthetic appearance, as illustrated in FIG. 6. Notably, in one embodiment, the cover 24 includes a resilient flexible edge 50 that is configured to deform about one or more cables 30 that are connected to the electronic device 46 or that are routed through the display base 18. As will be appreciated, this flexible edge 50 may include a strip of rubber, plastic, or the like. This arrangement allows peripheral devices to be connected or routed through the front of the display base 18, while providing orderly cable management in an aesthetically appealing manner.

Other configurations of display base 18 are also envisaged in accordance with the present techniques. By way of example, other embodiments may include a cover 50 having a rigid edge that cooperates with a flexible lip of the base to engage cables 32 extending from the display base. Further, other embodiments may include a cover 50 that is configured to provide an opening or gap between the cover 50 and the display base 18 to enable cable routing or connection through the gap. In another embodiment, the cover 50 is coupled to, or is an integral portion of, the electronic device 46. Moreover, either or both of the cover 50 and the module or device 46 may include a variety of fasteners or mounts to connect with the display base 18 and, specifically, the recessed portion 38. For example, the fasteners or mounts may include screws, thumbscrews, snap-fit mechanisms, latches, hooks, velcro, or some combination thereof.

Figure 7:
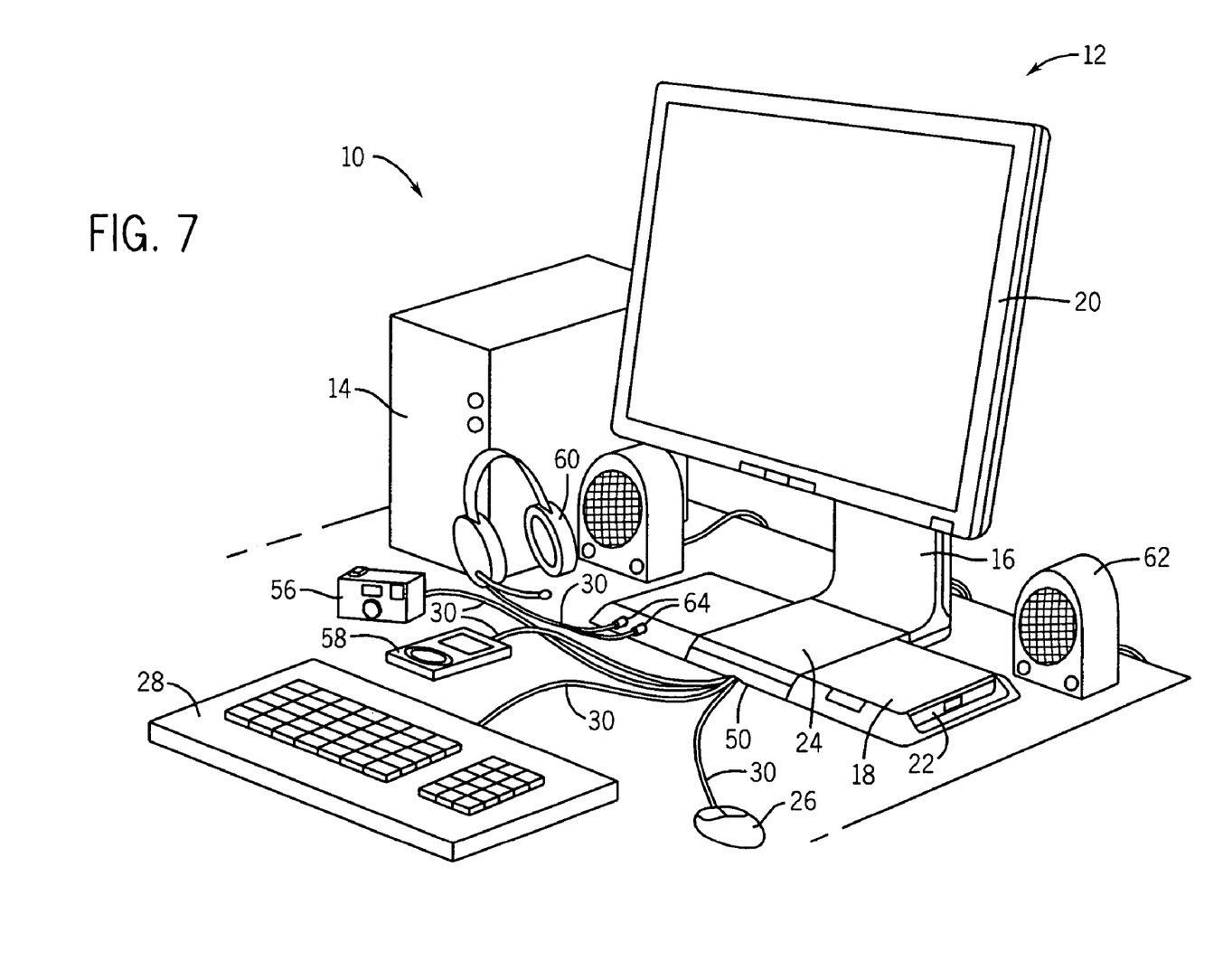
FIG. 7 is perspective view of an exemplary computer system having several peripheral components and a display base with cable routing features in accordance with one embodiment of the present techniques.

The computer system 10 may also include a number of other peripheral devices, as illustrated in FIG. 7. The peripheral components illustrated in FIG. 7 include a digital camera 56, a digital music player 58, a headset 60, and speakers 62. It should be noted that these are exemplary peripheral components, and that different peripheral components can be incorporated in other embodiments. In one embodiment, the digital camera 56 and the digital music player 58 are connected to an internal electronic device 46 via cables 30 to facilitate the charging of internal batteries of such devices and the transfer files between the devices and a computer. However, as discussed above, the cables 30 of the camera 56 and music player 58 may instead be routed through the display base 18 for direct connection to another device or system, such as computer 14. In a further embodiment, the display base 18 also includes integral audio or telephony connections 64 that enable direct connection of the headset 60 or the speakers 62 to the display base 18. In additional embodiments, the display base 18 may include other integral connections or ports, such as Ethernet connections, modem connections, or the like.

While the present technique may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A communication apparatus, comprising:
  a base adapted to couple to and support a display, the base comprising:
    a body comprising a top wall, a left wall, a right wall, and a bottom wall extending between the left and right walls;
    wherein the body includes a first bay configured to receive a first electronic device, the body having at least one surface including a recessed portion configured to receive a second electronic device, wherein the recessed portion includes a top opening extending through the top wall and positioned above the bottom wall; and
    at least one of a first cable routing feature disposed in the body and configured to route a first cable coupled to the first electronic device from the first bay into the recessed portion and a second cable routing feature configured to route a second cable coupled to the second electronic device from the recessed portion through a display stand coupled to the body.

2. The communication apparatus of claim 1, comprising the first electronic device.

3. The communication apparatus of claim 2, wherein the first electronic device comprises a memory drive.

4. The communication apparatus of claim 3, wherein the memory drive comprises an optical drive, or a magnetic drive, or a memory chip drive, or a combination thereof.

5. The communication apparatus of claim 1, comprising the second electronic device.

6. The communication apparatus of claim 5, wherein the second electronic device comprises a communication hub comprising a plurality of communication ports.

7. The communication apparatus of claim 6, wherein the plurality of ports comprises a USB port, or a FireWire port, or a network port, or a wireless access point, or a combination thereof.

8. The communication apparatus of claim 6, comprising the first electronic device disposed in the first bay in the left or right wall and coupled to a communication port of the communication hub.

9. The communication apparatus of claim 1, comprising a cover coupled to the top opening over the recessed portion opposite from the bottom wall, wherein the cover is configured to at least partially enclose the recessed portion.

10. The communication apparatus of claim 9, wherein the cover comprises a flexible edge extending along a front wall of the body, and the flexible edge is configured to contact a second cable coupled to the second electronic device.

11. The communication apparatus of claim 1, wherein the first cable routing feature comprises a cable channel extending between the first bay and the recessed portion.

12. The communication apparatus of claim 1, comprising:
  the first electronic device, the first electronic device comprising an optical drive; and
  the second electronic device, the second electronic device comprising a communication hub comprising a plurality of communication ports.

13. The communication apparatus of claim 1, wherein the body further includes:
  a second bay configured to receive a third electronic device, wherein the first and second bays are disposed opposite from one another in the left and right walls or the right and left walls; and a third cable routing feature disposed in the body and configured to route a third cable coupled to the third electronic device from the second bay into the recessed portion.

14. The communication apparatus of claim 1, wherein the body includes an integral connection port.

15. The communication apparatus of claim 14, wherein the integral connection port comprises an audio port.

16. A system, comprising:
  a display base, comprising:
    a first bay configured to receive a first electronic device;
    a recessed portion configured to receive a second electronic device, wherein the recessed portion comprises a top opening and a bottom wall opposite from the top opening;
    a cover removably coupled to the top opening over the recessed portion opposite from the bottom wall, wherein the cover comprises a flexible edge;
  a display stand coupled to the display base; and
  at least one of a first cable routing feature disposed in the display base and configured to route a first cable coupled to the first electronic device from the first bay into the recessed portion and a second cable routing feature configured to route a second cable coupled to the second electronic device from the recessed portion through the display stand.

17. The system of claim 16, comprising the first electronic device.

18. The system of claim 17, wherein the first electronic device comprises an optical drive.

19. The system of claim 16, comprising the second electronic device.

20. The system of claim 19, wherein the second electronic device comprises a communication hub comprising a plurality of communication ports.

21. The system of claim 16, wherein the cover is flush with a top wall of the display base while the cover is in a closed position over the top opening.

22. The system of claim 21, wherein the flexible edge is configured to contact a second cable coupled to the second electronic device while the cover is in the closed position.

23. The system of claim 16, further comprising a display coupled to the display.

24. The system of claim 23, comprising a computer capable of being communicatively coupled to the display.

25. The system of claim 24, comprising a peripheral device capable of being communicatively coupled to the computer.

26. The system of claim 25, comprising the second electronic device, wherein the second electronic device is disposed within the recessed portion of the display base directly above the bottom wall, and the peripheral device is communicatively coupled to the computer via the second electronic device.

27. The system of claim 25, wherein the peripheral device is communicatively coupled to the computer via a connection port integral with the display base.

28. A method for facilitating communication with a display base, the method comprising:
  receiving an optical drive within a first bay in a first side wall of a display base;
  receiving a communication hub through a top opening into a recessed portion of the display base, wherein the recessed portion comprises a bottom structure to support the communications hub; and
  routing at least one of a first cable extending from the optical drive through a first cable routing feature to the communication hub, wherein the first cable routing feature extends between the first bay and the recessed portion, and a second cable extending from the communication hub through a display stand coupled to the display base, wherein the second cable routing feature extends between the recessed portion and a port through a wall of the display stand.

29. The method of claim 28, comprising receiving a cover over the top opening to at least partially enclose the recessed portion such that a connection port of the communication hub is at least partially concealed.

30. The method of claim 28, comprising:
  receiving a second optical drive within a second bay in a second side wall of the display base, wherein the first and second side walls are opposite from one another; and
  routing a third cable extending from the second optical drive through a third cable routing feature to the communication hub, wherein the third cable routing feature extends between the second bay and the recessed portion.

31. The communication apparatus of claim 1, comprising the second electronic device disposed in the recessed portion, wherein the second electronic device comprises a Firewire hub.

32. The communication apparatus of claim 1, comprising the second electronic device disposed in the recessed portion, wherein the second electronic device comprises a network hub.

33. The communication apparatus of claim 9, wherein the cover is flush with the top wall while the cover is in a closed position over the top opening, and the recessed portion is completely enclosed by the cover, the bottom wall, and lateral walls of the body while the cover is in the closed position.

34. The system of claim 21, wherein the recessed portion is completely enclosed by the cover, the bottom wall, and lateral walls of the display base while the cover is in the closed position.

35. The method of claim 29, wherein the cover is flush with a top wall of the display base while the cover is in a closed position over the top opening.

36. The method of claim 29, wherein the recessed portion is completely enclosed by the cover, the bottom structure, and lateral structures of the display base while the cover is in a closed position over the top opening.

37. A system, comprising:
  a display base, comprising:
    a top receptacle in a top surface;
    a bottom wall directly below the top receptacle;
    a top cover removably disposed over the top receptacle opposite from the bottom wall;
    a left wall comprising a first drive bay;
    a right wall comprising a second drive bay;
    a flexible strip configured to at least partially cover a first cable passing to the top receptacle; and
    at least one of:
      a first cable routing feature disposed in the display base and configured to route a second cable between the first drive bay and the top receptacle;
      a second cable routing feature disposed in the display base and configured to route a third cable between the second drive bay and the top receptacle; and
      a third cable routing feature extending between the top receptacle and a port through a display stand coupled to the display base and configured to route a fourth cable from the top receptacle through the port.

38. The system of claim 37, comprising a flat panel display coupled to the display base.

39. The system of claim 37, wherein the flexible strip extends along an edge of the top cover.

40. The system of claim 37, comprising a first drive disposed in the first drive bay, a second drive disposed in the second drive bay, and an electronic device disposed in the top receptacle.

41. The system of claim 40, wherein the electronic device comprises a communication hub having a plurality of ports.

42. The communication apparatus of claim 1, wherein the second cable routing feature comprises a cable channel through the display stand and extending between the recessed portion and a port through a wall of the display stand.

43. The communication apparatus of claim 13, wherein the third cable routing feature comprises a cable channel extending between the second bay and the recessed portion.

44. The system of claim 23, wherein the display comprises a flat panel display.

* * * * *

UNITED STATES PATENT AND TRADEMARK OFFICE
CERTIFICATE OF CORRECTION

PATENT NO.        : 7,555,581 B2
APPLICATION NO.   : 11/253032
DATED             : June 30, 2009
INVENTOR(S)       : Randall W. Martin et al.

It is certified that error appears in the above-identified patent and that said Letters Patent is hereby corrected as shown below:

In column 7, line 43, in Claim 23, delete "display" and insert -- display stand --, therefor.

Signed and Sealed this

Tenth Day of November, 2009

David J. Kappos
*Director of the United States Patent and Trademark Office*